United States Patent
Shimizu et al.

(10) Patent No.: US 12,158,252 B2
(45) Date of Patent: Dec. 3, 2024

(54) VEHICLE LIGHT BODY

(71) Applicant: HONDA MOTOR CO., LTD., Tokyo (JP)

(72) Inventors: Go Shimizu, Tokyo (JP); Shunsuke Iwao, Tokyo (JP); Hiroya Ohkubo, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/522,261

(22) Filed: Nov. 29, 2023

(65) Prior Publication Data
US 2024/0191856 A1 Jun. 13, 2024

(51) Int. Cl.
*F21S 41/24* (2018.01)
*B60Q 1/26* (2006.01)
*F21S 41/36* (2018.01)
*F21V 5/04* (2006.01)

(52) U.S. Cl.
CPC ............ *F21S 41/36* (2018.01); *B60Q 1/2619* (2013.01); *F21S 41/24* (2018.01); *F21V 5/04* (2013.01)

(58) Field of Classification Search
CPC .......... F21V 5/004; F21V 5/005; F21V 7/048; F21V 7/0066; F21V 5/02; F21V 5/007; F21S 41/24; F21S 43/241; F21S 43/26; F21S 43/40; B60Q 1/0011; B60Q 1/02; B60Q 1/0041; B60Q 1/2607; B60Q 2400/20; F21W 2103/10; F21W 2103/20; F21W 2103/15; F21W 2103/45; F21W 2103/55; F21W 2107/10; G02B 6/0036; G02B 6/0038
See application file for complete search history.

(56) References Cited

U.S. PATENT DOCUMENTS

2011/0216549 A1* 9/2011 Futami .................. B60Q 1/0041
362/520
2015/0367773 A1 12/2015 Matsumaru et al.

FOREIGN PATENT DOCUMENTS

EP 3461687 A1 * 4/2019 .............. F21S 43/14
JP 2016006729 A 1/2016
WO WO-2018003428 A1 * 1/2018 .............. F21S 43/14

OTHER PUBLICATIONS

Search English translation of EP-3461687-A1 (Year: 2019).*
Search English translation of WO-2018003428-A1 (Year: 2018).*

* cited by examiner

*Primary Examiner* — Omar Rojas Cadima
(74) *Attorney, Agent, or Firm* — CKC & Partners Co., LLC

(57) ABSTRACT

The purpose is to facilitate the adjustment of the size of a light emitting region of a lens structure. A lens structure for a vehicle light body includes a light emitting part and a base. The light emitting part includes an introduction reflective surface which causes light from the base to completely reflect as parallel light to the Z- direction, and a back-side reflective surface arranged to the Z direction in the light emitting back surface. Each back-side reflective surface has a normal direction sloping relative to the Z direction, and causes the parallel light from the introduction reflective surface to completely reflect to the Y+ direction. The light emitting surface emits light from the back-side reflective surface.

5 Claims, 16 Drawing Sheets

FIG. 1
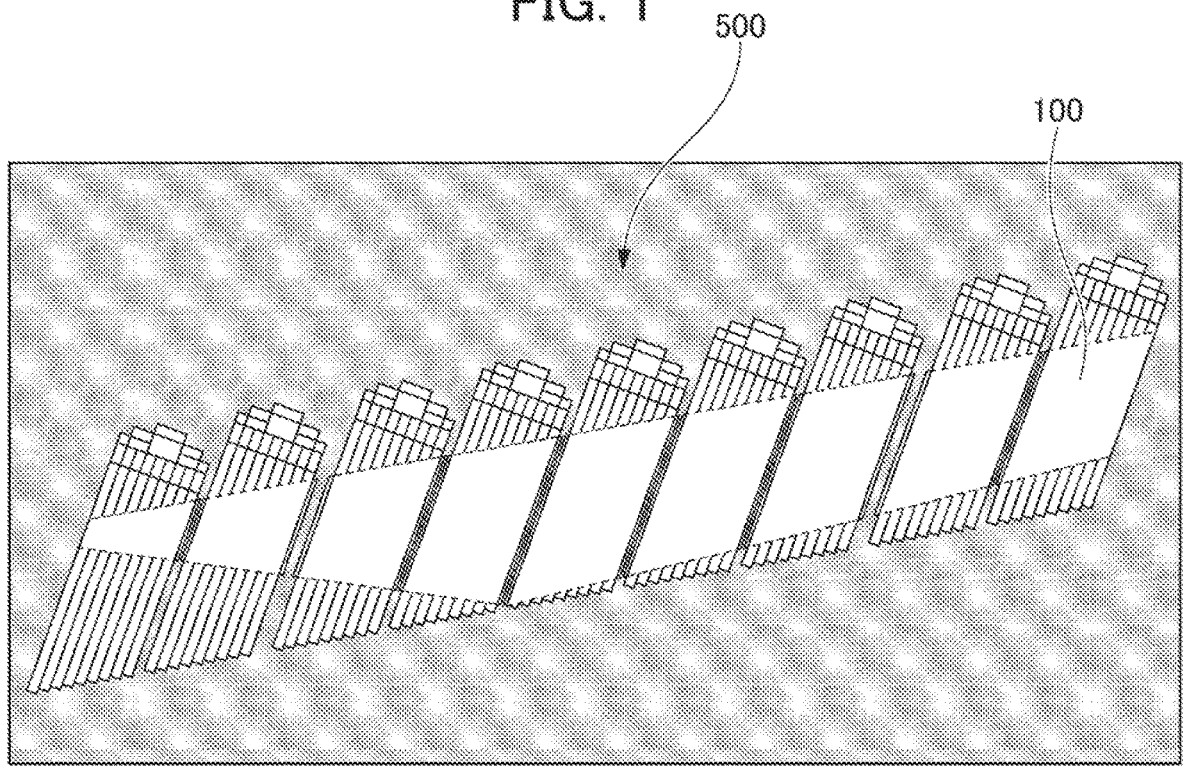
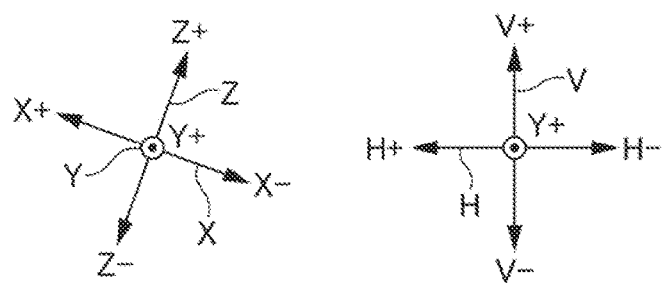

<PRESENT EMBODIMENT>

VEHICLE LIGHT BODY

This application is based on and claims the benefit of priority from Chinese Patent Application No. CN202211566346.9, filed on 7 Dec. 2022, the content of which is incorporated herein by reference.

BACKGROUND OF THE INVENTION

Field of the Invention

The present invention relates to a lens structure which can be used in a vehicle light body.

Related Art

In a lens structure, for example, there are those which guide light from a light source to above or the like, in a desired direction such as ahead by complete reflection.
Patent Document 1: Japanese Unexamined Patent Application, Publication No. 2016-6729

SUMMARY OF THE INVENTION

The present inventors have focused on being able to contribute to a functional improvement in the vehicle light body, etc., if facilitating the adjustment of the size of the light emitting region of such a lens structure. By extension, they have focused on being able to contribute to the development of a sustainable transport system by even further improving the safety of traffic, by contributing to improvements in visibility and ones noticeability for night driving.

The present invention has been made taking account of the above situation, and has an object of facilitating adjustment of the size of a light emitting region of a lens structure.

The present inventors have found that, if the reflective surface totally reflecting parallel light propagating in the face length direction of the light emitting surface to the light emitting surface side are arranged to the travel direction of the parallel light on the light emitting back surface on an opposite side to the light emitting surface, the adjustment of the size of the light emitting region of the light emitting surface is facilitated, thereby arriving at the present invention. The present invention is a lens structure for a vehicle light body according to the following first to sixth aspects.

A lens structure for a vehicle light body according to a first aspect of the present invention causes light to emit in a Y+ direction as one way of a predetermined Y direction, the lens structure including:
  a light emitter extending in a Z direction orthogonal to the Y direction, and having a light emitting surface at an end face on a side of the Y+ direction, and a light emitting back surface at an end face in a Y− direction opposite the Y+ direction; and
  a base which guides light to an end of the light emitter in a Z+ direction as one way of the Z direction, in which the light emitter includes an introduction reflective surface which causes light from the base to completely reflect as parallel light to a Z− direction which is opposite to the Z+ direction, and a back-side reflective surface arranged in the Z direction on the light emitting back surface,
  each of the back-side reflective surfaces has a normal direction sloping relative to the Z direction, and completely reflects the parallel light from the introduction reflective surface to the Y+ direction, and the light emitting surface causes light to emit from the back-side reflective surface.

According to the present configuration, by adjusting the size and Z-direction pitch of each back-side reflective surface in the design stage, it is possible to adjust the size in the Z direction of the reflective region including these back-side reflective surfaces. It is thereby possible to adjust the size in the Z direction of the light emitting region of the light emitting surface.

According to a second aspect of the present invention, in the lens structure for a vehicle light body as described in the first aspect, at least one reflective row containing a plurality of the back-side reflective surfaces arranged in the Z direction is provided to the light emitting back surface, and within each of the reflective rows, a back-side reflective surface more to a side in the Z− direction is positioned more to a side in the Y+ direction.

According to the present configuration, since a back-side reflective surface more to the side in the Z− direction is positioned more to a side in the Y+ direction, the parallel light to the Z− direction hits the back-side reflective surface in order from one more to a side in the Y− direction, and completely reflects to the Y+ direction. For this reason, it is possible to completely reflect the parallel light in the Z− direction to the Y+ direction in order efficiently.

According to a third aspect of the present invention, in the lens structure for a vehicle light body as described in the second aspect, in a plan view seen in the Y direction, a plurality of the reflective rows is shifted from each other in the Z direction, and is arranged in an X direction orthogonal to the Z direction and the Y direction, within a reflective region of a difference shape than rectangular.

According to the present configuration, even in a case of the reflective region being a distorted shape differing from a rectangle such as a parallelogram, it is possible to handle without waste by shifting the reflective rows in the Z direction from each other.

According to a fourth aspect of the present invention, in the lens structure for a vehicle light body as described in the first or second aspect, an optical row in which optical cuts for diffusing light from the back-side reflective surface are arranged in a vertical direction is arranged in an orthogonal direction which is orthogonal to the vertical direction and the Y direction.

According to the present configuration, by arranging in parallel in an orthogonal direction the optical rows extending in the vertical direction, it is possible to form a region of optical cuts spreading in the vertical direction and orthogonal direction.

According to a fifth aspect of the present invention, in the lens structure for a vehicle light body as described in the fourth aspect,
  a plurality of the optical rows is disposed to be shifted from each other in the Y direction.

According to the present configuration, by shifting the optical rows in the Y direction from each other, it is possible to shift the ends on the Y+ direction side of each optical row aligned in the orthogonal direction in the Y direction smoothly in order, while orienting the optical axis direction of each optical row in the Y+ direction.

According to a sixth aspect of the present invention, in the lens structure for a vehicle light body as described in the fourth aspect, a plurality of the optical cuts is disposed to be shifted from each other in the Y direction within the optical row.

According to the present configuration, by shifting the optical rows in the Y direction from each other, it is possible to shift the ends on the Y+ direction side of each optical row aligned in the orthogonal direction in the Y direction smoothly in order, while orienting the optical axis direction of each optical row in the Y+ direction.

According to the configuration of the first aspect as above, it is possible to facilitate adjustment of the size of a light emitting region of a lens structure. Furthermore, the respective additional effects are obtained by the configurations of the second to sixth aspects citing the first aspect.

BRIEF DESCRIPTION OF THE DRAWINGS

FIG. 1 is a front view showing a headlight using the lens structure according to a first embodiment;

DETAILED DESCRIPTION OF THE INVENTION

Hereinafter, embodiments of the present invention will be explained while referencing the drawings. However, the present invention is not to be limited in any way to the following embodiments, and can be realized by appropriately modifying within a scope not departing from the gist of the present invention.

First Embodiment

As shown in FIG. 1, the lens structure 100 is adopted as part of a headlight 500. More specifically, the lens structure 100 of the present embodiment constitutes the lens structure of a left end portion of the left-side headlight 500 viewed from a driver's side.

Hereinafter, a predetermined three directions which are orthogonal to each other are referred to as "X direction", "Y direction", and "Z direction". More specifically, in the present embodiment, the Z direction is a direction slightly inclined relative to a vertical direction V, and the Y direction is a horizontal direction. The Y+ direction may be rephrased as "irradiating direction". Hereinafter, a direction orthogonal to the vertical direction V and Y direction is referred to as the "H direction". The H direction may be rephrased as "orthogonal direction". The X direction is a direction slightly inclined relative to the H direction.

Hereinafter, one way in the X direction is referred to as "X− direction", and the opposite direction thereto is referred to as "X+ direction". In addition, one way in the Y direction is referred to as "Y− direction", and the opposite direction thereto is referred to as "Y+ direction". In addition, one way in the Z direction is referred to as "Z− direction", and the opposite direction thereto is referred to as "Z+ direction". In addition, one way in the H direction is referred to as "H− direction", and the opposite direction thereto is referred to as "H+ direction". It should be noted that, in the respective drawings, a plane having a normal direction sloping 45° relative to any two of the X direction, Y direction and Z direction will be dot hatched.

Figure 4:
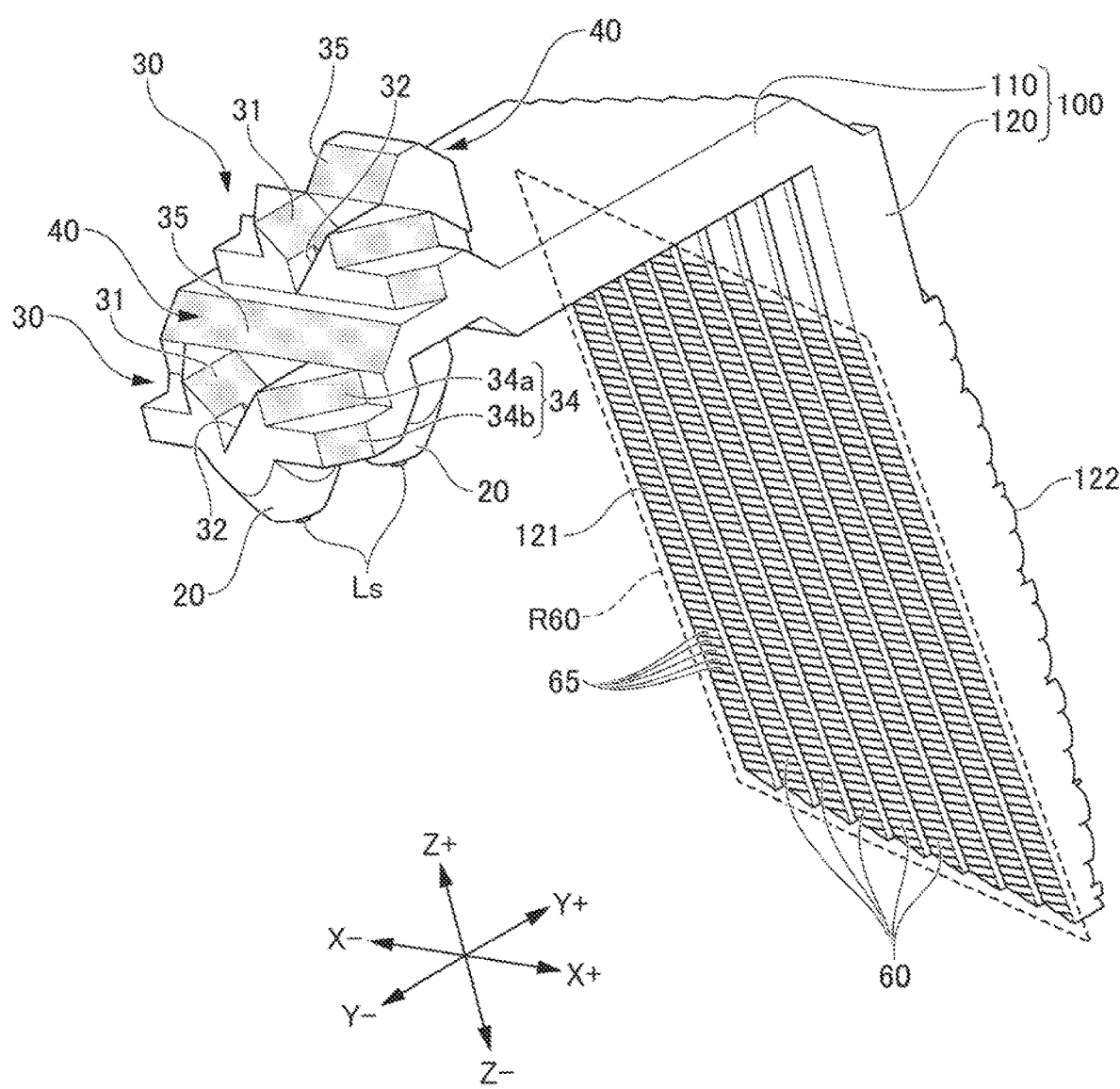
FIG. 4 is a perspective view showing the lens structure from a different angle.

As shown in FIG. 4, one or a plurality of light sources Ls are installed to the lens structure 100. More specifically, in the present embodiment, although there are two light sources Ls, it may be one, three or more. The lens structure 100 guides the light from each light source Ls in the Z+ direction to the Y+ direction. The lens structure 100 includes a base 110 extending in the Y direction, and a light emitting part 120 extending in the Z direction. More specifically, the light emitting part 120 extends from an end on the Y+ direction side of the base 110 to the Z− direction.

First, the structure of the base 110 will be explained. As shown in FIG. 4, the base 110 has one collimator 20, reflector 30 and light guide 40 for every light source Ls. In other words, the base 110 has two of each of the collimator 20, reflector 30 and light guide 40.

Figure 8:
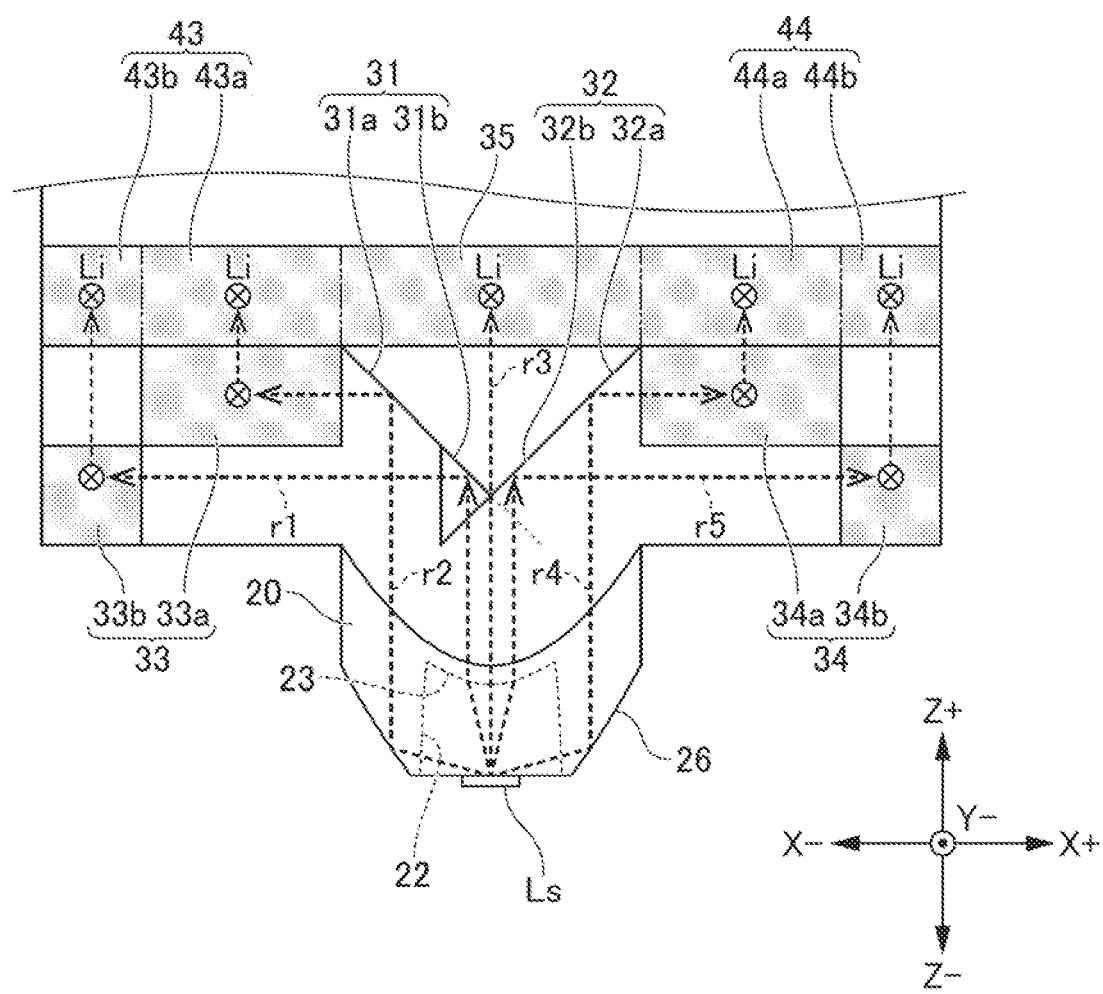
FIG. 8 is a view showing the reflector in a Y direction.

The two collimators 20 are provided side-by-side in the Y direction at the end on the Y− direction side of the base 110, and each collimator 20 projects in the Z− direction. As shown in FIG. 8, each collimator 20 has a incidence recess 22, first curved surface 23 and second curved surface 26. The incidence recess 22 makes a shape recessed in the Z+ direction, and the light source Ls is installed inside or at an outer part on the Z− direction side. The first curved surface 23 is provided at a ceiling plane of the incidence recess 22, and projects in a convex lens shape in the Z− direction. On the other hand, the second curved surface 26 is provided at a lateral face of the collimator 20. The light from the light source Ls is incident from the incidence recess 22 into the lens structure 100. The first curved surface 23 converts the diffused light from the light source Ls to the Z+ direction side into parallel light in the Z+ direction. On the other hand, the second curved surface 26 converts the diffused light from the light source Ls to the lateral side, i.e. diffused light to the X direction side and Y direction side, into parallel light in the Z+ direction.

Figure 6:
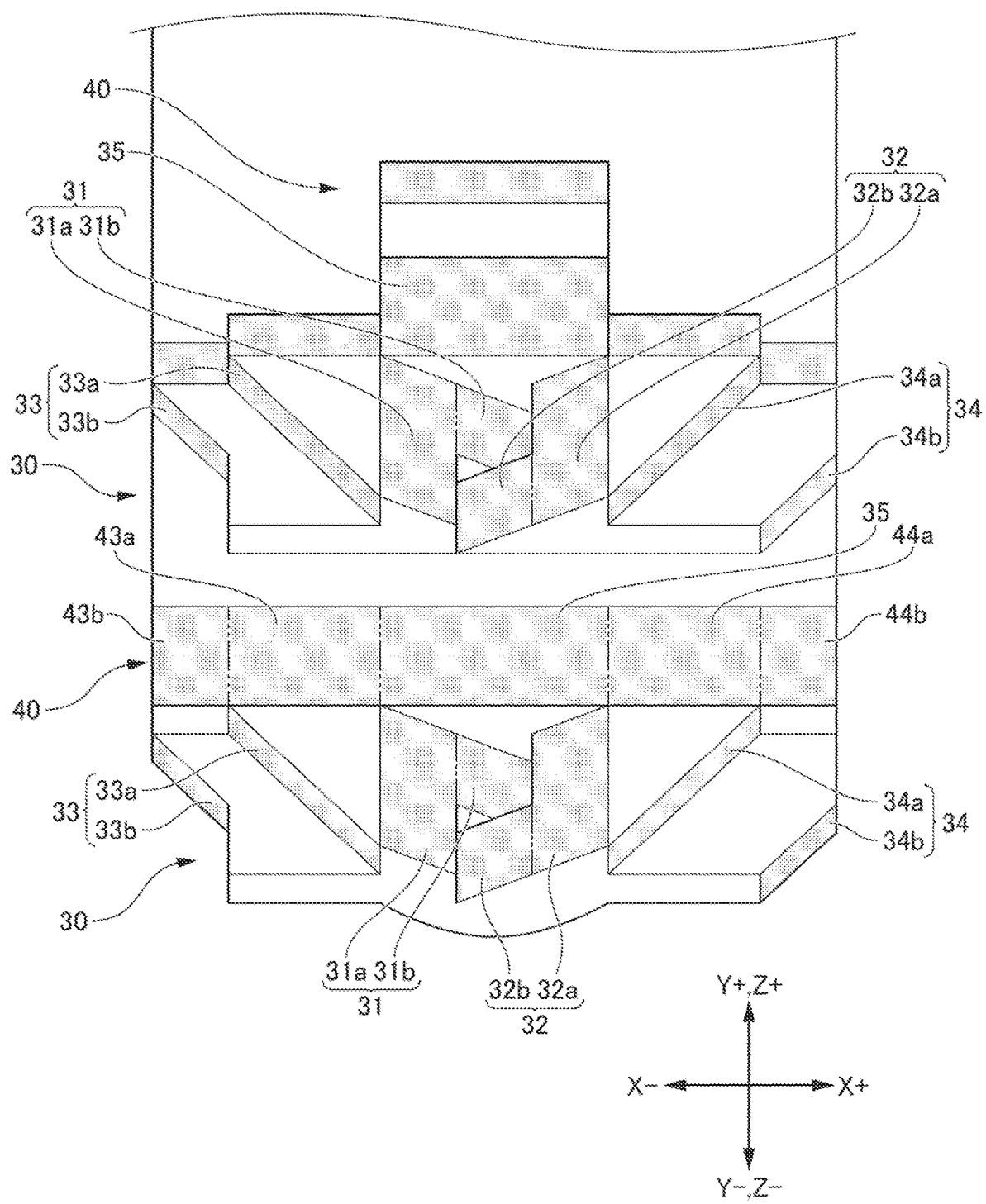
FIG. 6 is a perspective view showing a reflector.

As shown in FIG. 6, each of the two reflectors 30 has a first reflective surface 31, second reflective surface 32, third reflective surface 33, fourth reflective surface 34 and fifth reflective surface 35. The first reflective surface 31, second reflective surface 32 and fifth reflective surface 35 are provided at positions advancing from the collimator 20 to the Z+ direction.

Figure 7:
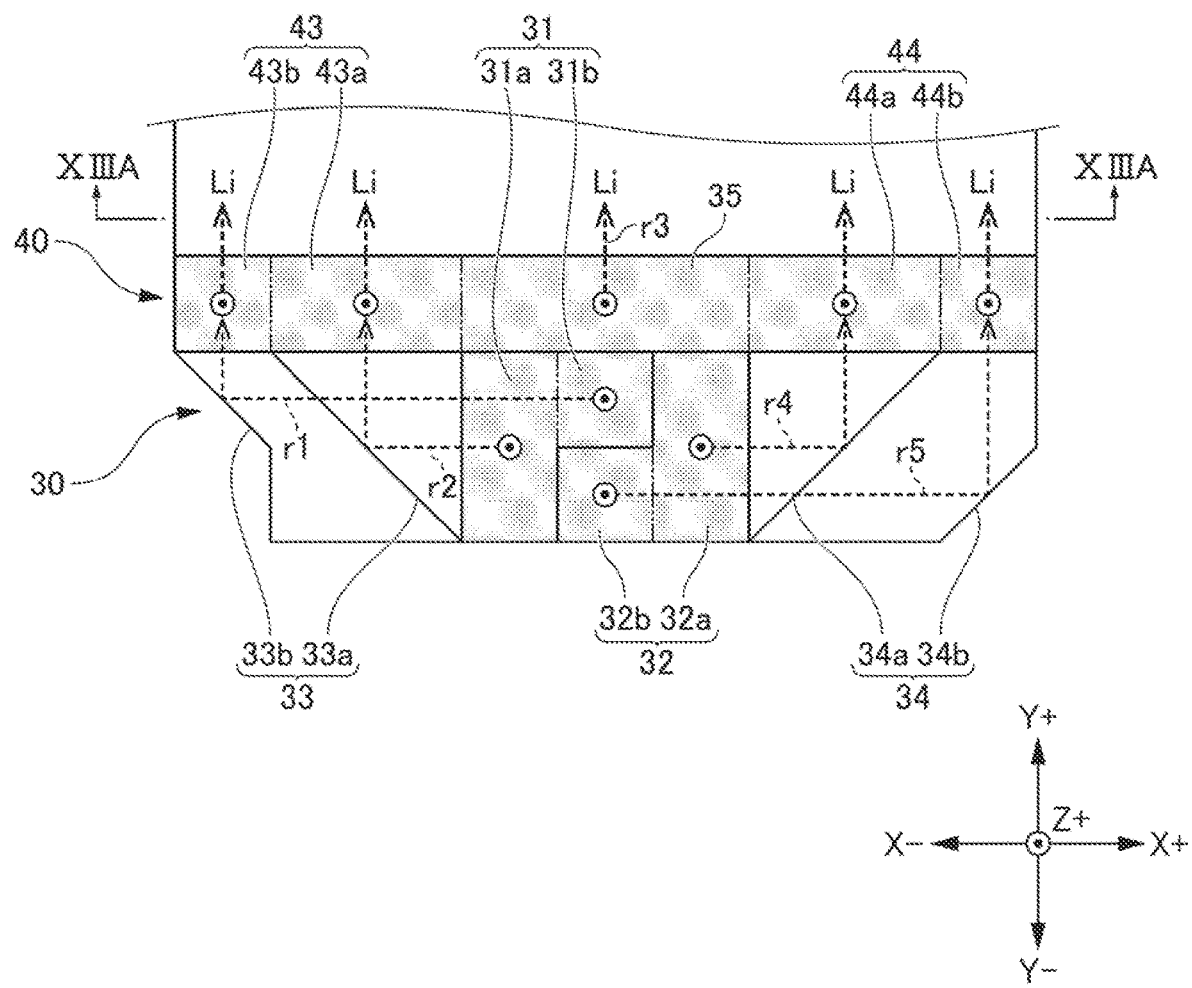
FIG. 7 is a perspective view showing the reflector in a Z direction.

As shown in FIG. 7, a region consisting of the first reflective surface 31, second reflective surface 32 and fifth reflective surface 35 makes a shape which is square in a plan view seen in the Z direction. The fifth reflective surface 35 extends in the X direction. The first reflective surface 31 is provided near the X− direction in a region more to the Y− direction side than the fifth reflective surface 35. The second reflective surface 32 is provided near the X+ direction in a region more to the Y− direction side than the fifth reflective surface 35.

Each of these reflective surfaces 31 to 35 are formed integrally, and formed by 3D printing or die forming, for example. It should be noted that, according to the above such reflective surfaces 31 to 35, it is possible to form by a simple die which opens in the Z direction, and it is possible to easily arrange a plurality of reflectors 30 side by side.

Figure 5:
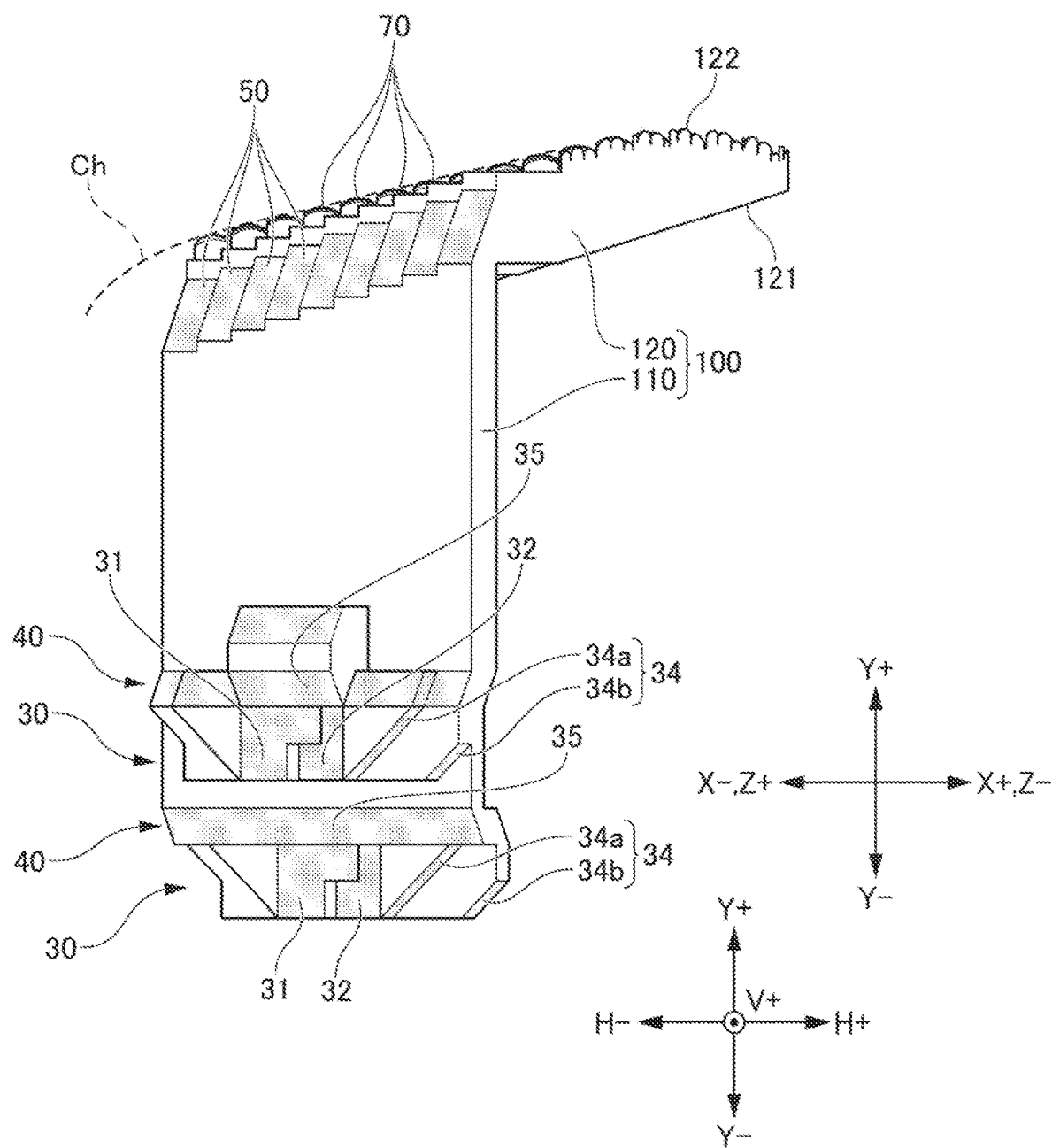
FIG. 5 is a view showing the lens structure from above.

As shown in FIG. 5, the fifth reflective surface 35 has a normal direction sloping 45° to the Y+ direction side relative to the Z− direction, and the light Li from the collimator 20 is completely reflected to the Y+ direction.

As shown in FIG. 6, the first reflective surface 31 has a normal direction sloping 45° to the X− direction side relative to the Z− direction, and the light Li from the collimator 20 is completely reflected to the Y+ direction. More specifically, the first reflective surface 31 has a first reflective surface main part 31a and first reflective surface sub part 31b. The first reflective surface sub part 31b projects to the X+ direction from a portion near the Y+ direction of the first reflective surface main part 31a. Consequently, the first reflective surface sub part 31b is shorter to the Y direction than the first reflective surface main part 31a. More specifically, as shown in FIG. 7, the length in the Y direction of the first reflective surface sub part 31b is half of the length in the Y direction of the first reflective surface main part 31a.

As shown in FIG. 6, the second reflective surface 32 has a normal direction sloping 45° to the X+ direction side relative to the Z− direction, and the light Li from the collimator 20 is completely reflected to the X+ direction. More specifically, the second reflective surface 32 has a second reflective surface main part 32a and second reflective surface sub part 32b. The second reflective surface sub part 32b projects to the X− direction from a portion near the Y− direction of the second reflective surface main part 32a. Consequently, the second reflective surface sub part 32b is shorter in the Y direction than the second reflective surface main part 32a. More specifically, as shown in FIG. 7, the length in the Y direction of the second reflective surface sub part 32b is half of the length in the Y direction of the second reflective surface main part 32a.

As shown in FIG. 7, in the plan view seen in the Z direction, the first reflective surface sub part 31b and second reflective surface sub part 32b are arranged side by side in the Y direction. Then, as shown in FIG. 8, in the plan view seen in the Y direction, the first reflective surface sub part 31b and second reflective surface sub part 32b are intersecting.

As shown in FIG. 6, the third reflective surface 33 has a third reflective surface main part 33a and third reflective surface sub part 33b. Both the third reflective surface main part 33a and third reflective surface sub part 33b have a normal direction sloping 45° to the Y+ direction side relative to the X+ direction. The third reflective surface main part 33a and third reflective surface sub part 33b are arranged to be shifted from each other in the X direction as shown in FIG. 7, and arranged to be shifted from each other also in the Z direction as shown in FIG. 8. As shown in FIG. 7, the third reflective surface main part 33a is provided at a position advancing from the first reflective surface main part 31a to the X− direction, and the light from the first reflective surface main part 31a is completely reflected to the Y+ direction. The third reflective surface sub part 33b is provided at a position advancing from the first reflective surface sub part 31b to the X− direction, and the light from the first reflective surface sub part 31b is completely reflected to the Y+ direction.

As shown in FIG. 6, the fourth reflective surface 34 has a fourth reflective surface main part 34a and fourth reflective surface sub part 34b. Both the fourth reflective surface main part 34a and fourth reflective surface sub part 34b have a normal direction sloping 45° to the Y+ direction side relative to the X− direction. The fourth reflective surface main part 34a and fourth reflective surface sub part 34b are arranged to be shifted from each other in the X direction as shown in FIG. 7, and arranged to be shifted from each other also in the Z direction as shown in FIG. 8. As shown in FIG. 7, the fourth reflective surface main part 34a is provided at a position advancing from the second reflective surface main part 32a to the X+ direction, and light from the second reflective surface main part 32a is entirely reflected to the Y+ direction. The fourth reflective surface sub part 34b is provided at a position advancing from the second reflective surface sub part 32b to the X+ direction, and the light from the second reflective surface sub part 32b is entirely reflected to the Y+ direction.

Consequently, as shown in FIG. 7, the third reflective surface 33 entirely reflects the light from the first reflective surface 31 to the Y+ direction, and the fourth reflective surface 34 entirely reflects the light from the second reflective surface 32 to the Y+ direction.

Hereinafter, as shown in FIGS. 7 and 8, the route via the first reflective surface sub part 31b and third reflective surface sub part 33b is referred to as "first route r1". In addition, the route via the first reflective surface main part 31a and third reflective surface main part 33a is referred to as "second route r2". In addition, the route via the fifth reflective surface 35 is referred to as "third route r3". In addition, the route via the second reflective surface main part 32a and fourth reflective surface main part 34a is referred to as "fourth route r4". In addition, the route via the second reflective surface sub part 32b and fourth reflective surface sub part 34b is referred to as "fifth route r5".

The light Li from the collimator 20 to the Z+ direction is guided to the Y+ direction from each of the first to fifth routes r1 to r5.

As shown in FIG. 4, the light guide 40 guides the light from these five routes r1 to r5 to the Y+ direction to the light emitting part 120, after aligning in the Z direction and arranging in a straight line in the X direction. More specifically, the light Li from the reflector 30 on the Y− side to the Y+ direction is guided near the Z+ side of the base 110 by the light guide 40 corresponding to this reflector 30. On the other hand, the light Li from the reflector 30 on the Y+ side to the Y+ direction is guided near the Z− side of the base 110 by the light guide 40 corresponding to this reflector 30.

Figure 9:
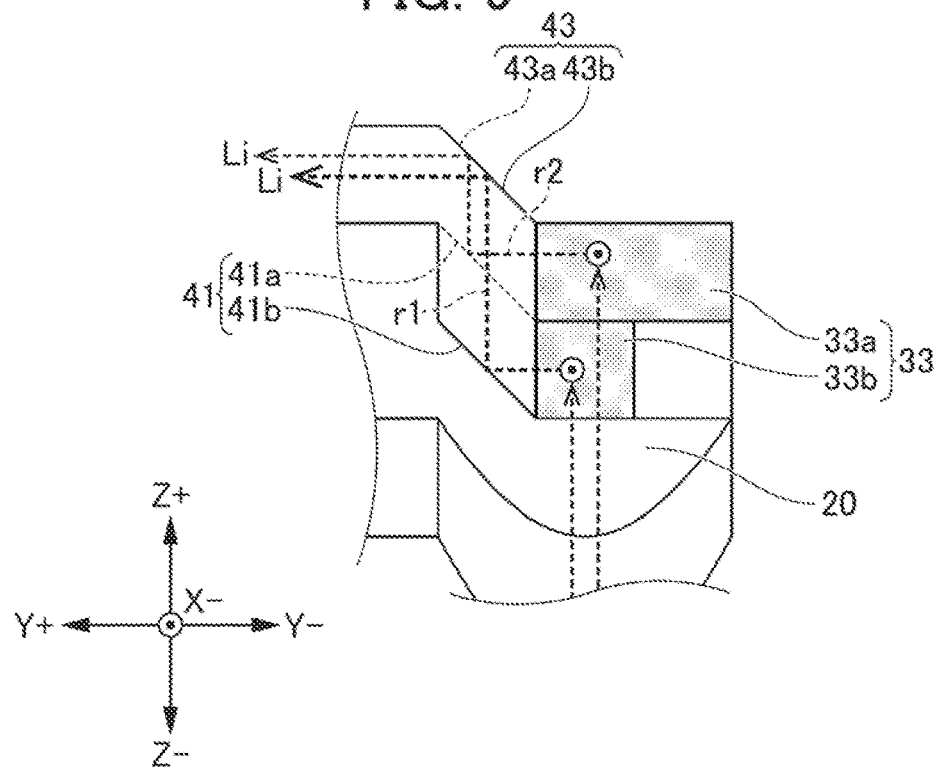
FIG. 9 is a side view showing the reflector and a light guide in an X+ direction.
Figure 10:
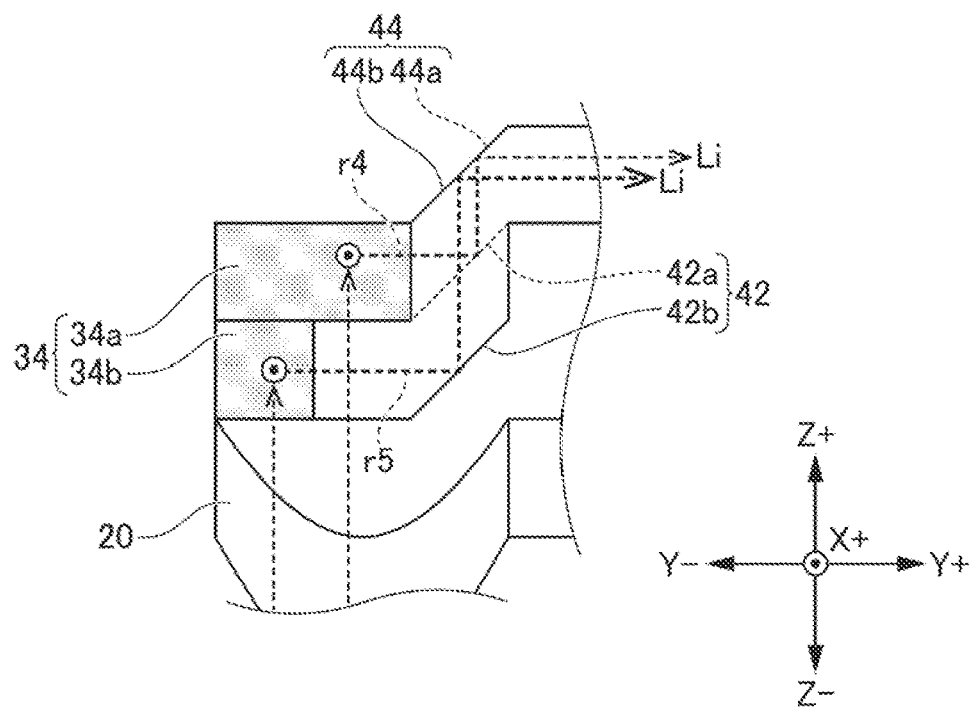
FIG. 10 is a side view showing the reflector and the light guide in an X− direction.

More specifically, for example, as shown in FIG. 9, the light guide 40 on the Y− direction side has a first sloped face 41 and third sloped face 43, and the second sloped face 42 and fourth sloped face 44 shown in FIG. 10.

As shown in FIG. 9, the first sloped face 41 has a first sloped face main part 41a and first sloped face sub part 41b. The first sloped face main part 41a and first sloped face sub part 41b both have a normal direction sloping 45° to the Z+ direction relative to the Y− direction. The first sloped face main part 41a is provided at a position advancing from the third reflective surface main part 33a to the Y+ direction, and the light from the third reflective surface main part 33a is entirely reflected to the Z+ direction. The first sloped face sub part 41b is provided at a position advancing from the third reflective face sub part 33b to the Y+ direction, and the light from the third reflective face sub part 33b is entirely reflected to the Z+ direction.

As shown in FIGS. 7 and 8, the third sloped face 43 has a third sloped face main part 43a and third sloped face sub part 43b. The third sloped face main part 43a and third sloped face sub part 43b both have a normal direction sloping 45° to the Y+ direction relative to the Z− direction. As shown in FIG. 9, the third sloped face main part 43a is provided at a position advancing from the first sloped face main part 41a to the Z+ direction, and the third sloped face sub part 43b is provided at a position advancing from the first sloped face sub part 41b to the Z+ direction. Based on this, the third sloped face main part 43a is provided more to the X− direction side than the fifth reflective surface 35, and the third sloped face sub part 43b is provided further to the X− direction side than the third sloped face main part 43a.

It should be noted that, for visibility in FIGS. 7 and 8, a two-dot chain line is drawn between each of the third sloped face sub part 43b and third sloped face main part 43a, and between the third sloped face main part 43a and fifth reflective surface 35; however, the third sloped face sub part 43b, third sloped face main part 43a and fifth reflective surface 35 are flush. The third sloped face main part 43a causes the light from the first sloped face main part 41a to be completely reflected to the Y+ direction, and the third sloped face sub part 43b causes the light from the first sloped face sub part 41b to be completely reflected to the Y+ direction.

As shown in FIG. 10, the second sloped face 42 has a second sloped face main part 42a and second sloped face sub part 42b. As shown in FIGS. 7 and 8, the fourth sloped face 44 has a fourth sloped face main part 44a and fourth sloped face sub part 44b. The explanation for the second sloped face 42 and fourth sloped face 44 is the same by replacing terms as follows in the explanation for the first sloped face 41 and third sloped face 43 shown above. In other words, "FIG. 9" is replaced with "FIG. 10", "first sloped face" is replaced with "second sloped face", "third sloped face" is replaced with "fourth sloped face". Each one of "X+ direction" and "X- direction" is replaced with the other, and the reference number is replaced with the corresponding one.

According to the above configuration, as shown in FIG. 8, the light from each of the first to fifth routes r1 to r5 to the Y+ direction is collected in the Z direction and aligned to the X direction.

The light guide 40 on the Y+ direction shown in FIG. 4 also collects in the Z direction the light Li to the Y+ direction from the five routes r1 to r5 of the reflectors 30 corresponding to itself and aligns in the X direction.

Figure 11:
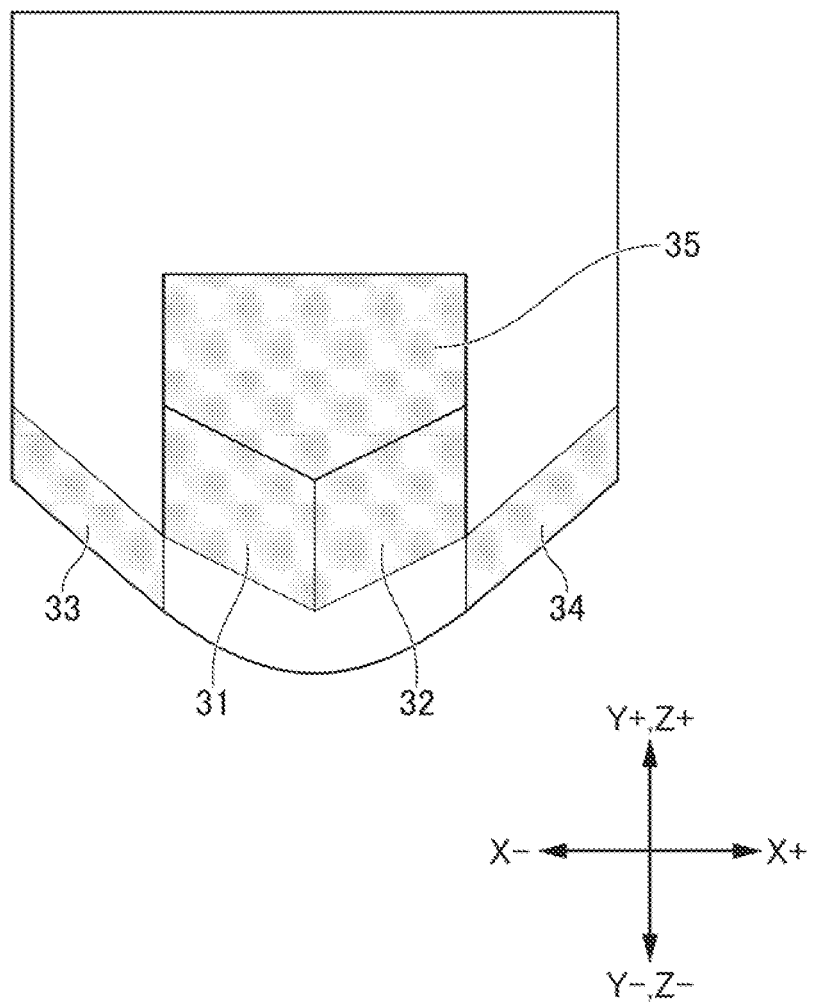
FIG. 11 is a perspective view showing a lens structure according to a comparative example.
Figure 12A:
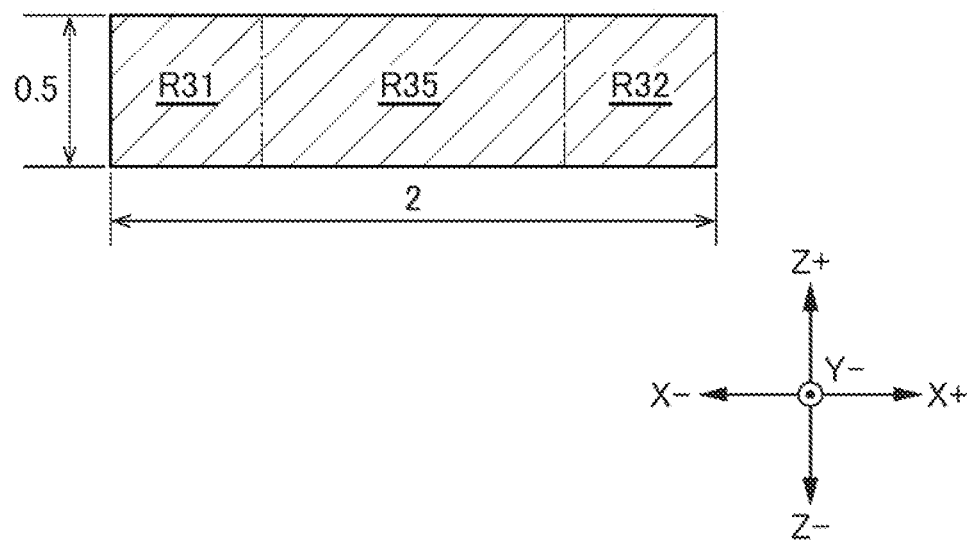
FIG. 12A is a view showing a cross-sectional shape of a region of light.
Figure 12B:
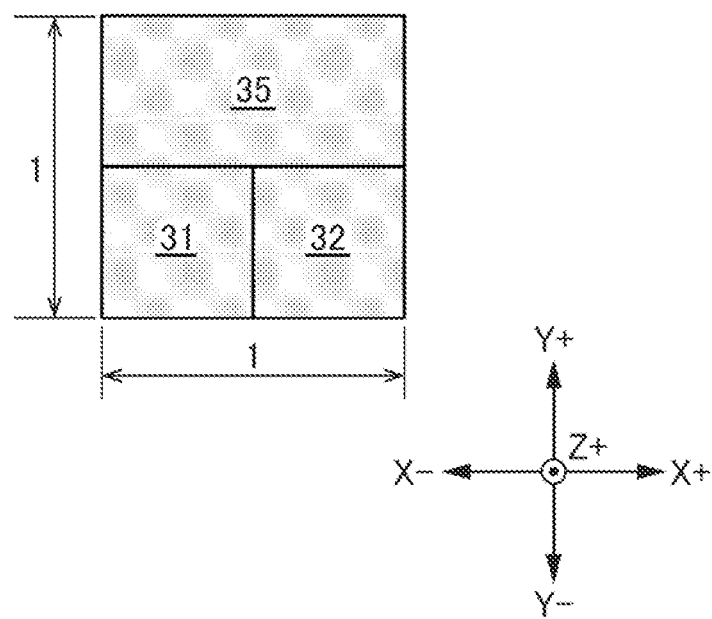
FIG. 12B is a plan view showing first, second and fifth reflective surfaces.

Next, the function of the base 110 will be explained. Hereinafter, the embodiment shown in FIGS. 11, 12A and 12B is referred to as a comparative example. In the comparative example, as shown in FIG. 12B, in the plan view seen in the Z+ direction, the first reflective surface 31 and second reflective surface 32 assume a simple rectangular shape, and the third reflective surface 33 and fourth reflective surface 34 also assume a shape corresponding to these, as shown in FIG. 11.

In the case of the comparative example, as shown in FIG. 12B, the shapes of the first reflective surface 31 and second reflective surface 32 are simple rectangles; therefore, the cross-sectional shape of the region of light Li guided in the Y+ direction is also simplified as shown in FIG. 12A. Based on this, it is possible to sufficiently elongate in the X direction the cross-sectional shape of this region of light Li guided in the Y+ direction.

It should be noted that "R31" in the drawings indicates the region of light Li guided from the first reflective surface 31, "R32" in the drawings indicates the region of light Li guided from the second reflective surface 32, and "R35" in the drawings indicates the region of light Li guided from the fifth reflective surface 35. As shown in FIG. 12B, viewing in the Z direction, in the case of the region including the fifth reflective surface 35, first reflective surface 31 and second reflective surface 32 being square, the aspect ratio of the cross-sectional shape of the region of light Li guided in the Y+ direction must be 0.5:2, i.e. 1:4, as shown in FIG. 12A.

Figure 13A:
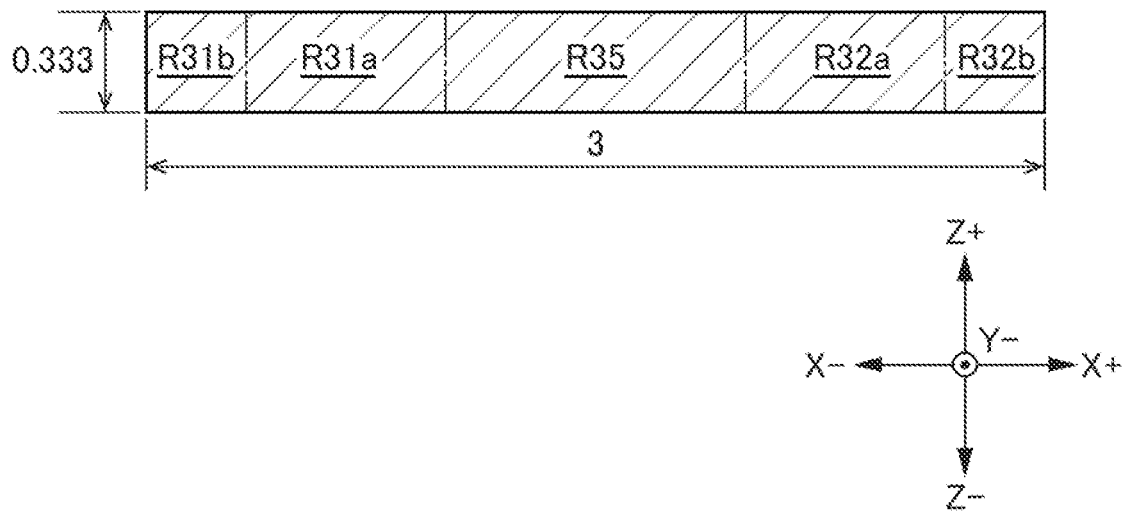
FIG. 13A is a view showing a cross-sectional shape of a region of light in the present embodiment.
Figure 13B:
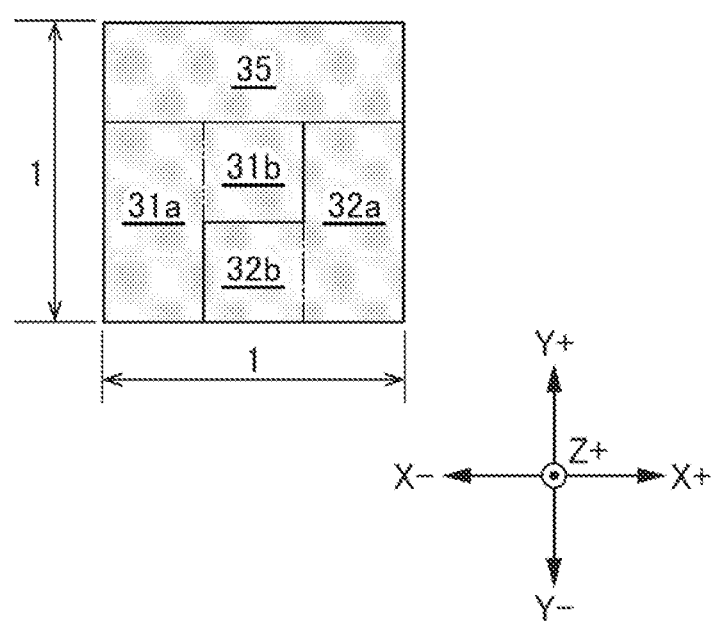
FIG. 13B is a plan view showing first, second and fifth reflective surfaces.

In contrast, in the present embodiment, as shown in FIG. 13B, the first reflective surface 31 includes the first reflective surface sub part 31b projecting from the first reflective surface main part 31a to the X+ direction, and the second reflective surface 32 includes the second reflective surface sub part 32b projecting from the second reflective surface main part 32a to the X− direction. Based on this, as shown in FIG. 13A, it is possible to sufficiently elongate in the X direction the cross-sectional shape of light Li guided to the Y+ direction.

It should be noted that "R31b" in the drawings indicates the region of light Li guided from the first reflective surface sub part 31b, and "R31a" in the drawings indicates the region of light Li guided from the first reflective surface main part 31a. In addition, "R35" in the drawings indicates the region of light Li guided from the fifth reflective surface 35. In addition, "R32a" in the drawings indicates the region of light Li guided from the second reflective surface main part 32a, and "R32b" in the drawings indicates the region of light Li guided from the second reflective surface sub part 32b. As shown in FIG. 13B, viewing in the Z direction, in the case of the region including the fifth reflective surface 35, first reflective surface 31 and second reflective surface 32 being square, the aspect ratio of the cross-sectional shape of this region of light Li must be 0.333:3, i.e. 1:9, as shown in FIG. 13A. For this reason, according to the present embodiment, it is possible to elongate in the X direction the cross-sectional shape of the region of light Li guided in the Y+ direction.

Figure 14:
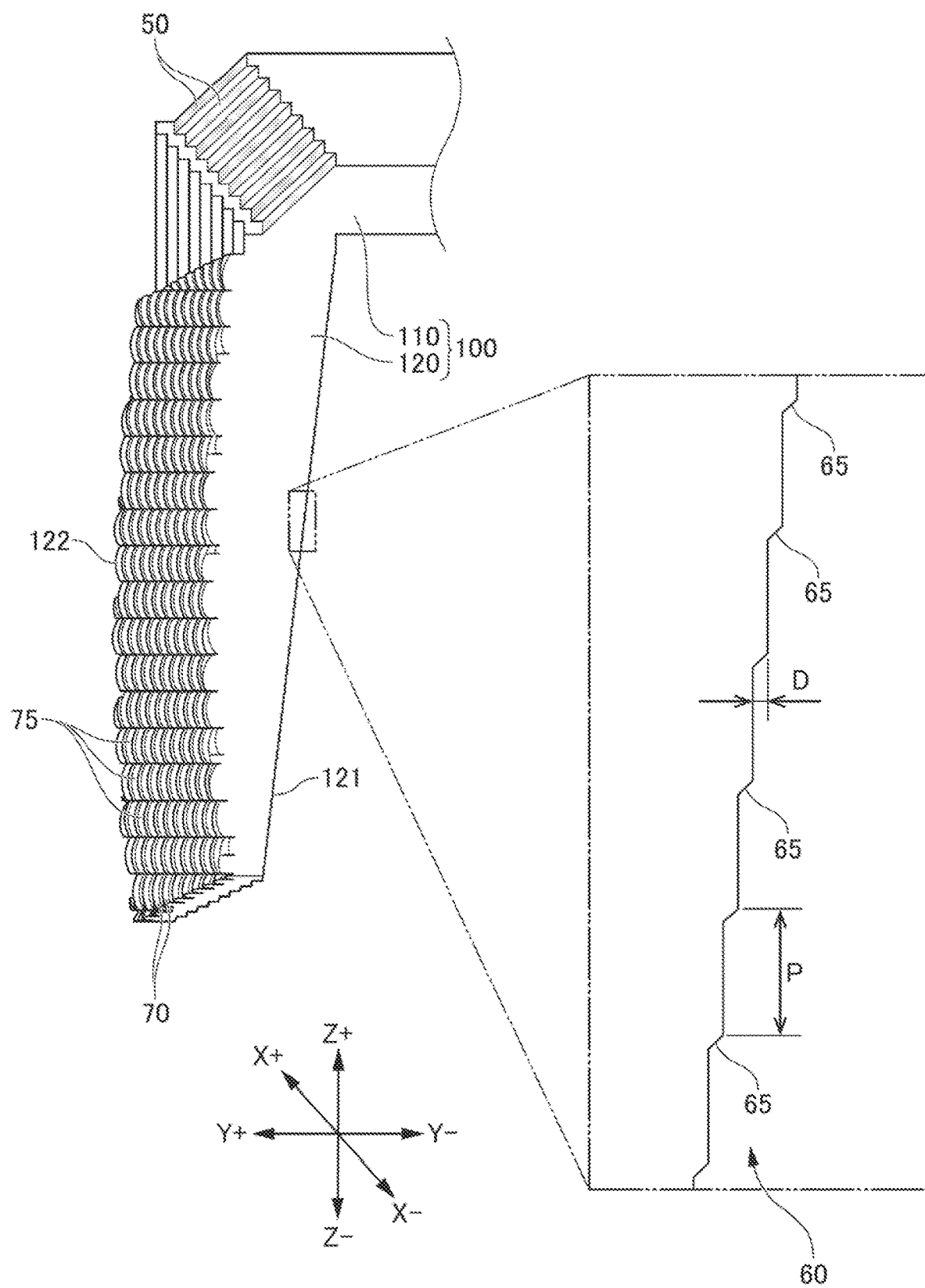
FIG. 14 is a perspective view showing a light-emitting part of the lens structure.

Next, the structure of the light emitting part 120 will be explained. As shown in FIG. 14, a plurality of introduction reflective surfaces 50 are arranged in the X direction at an end on the Z+ direction side of the light emitting part 120. On this plurality of introduction reflective surfaces 50, the light from the base 110 to the Y+ direction, i.e. parallel light to the Y+ direction elongated in the X direction, is incident. Each introduction reflective surface 50 has a normal direction sloping 45° to the z− direction side relative to the Y− direction, and the light from the base 110 to the Y+ direction is completely reflected to the Z− direction.

Figure 3:
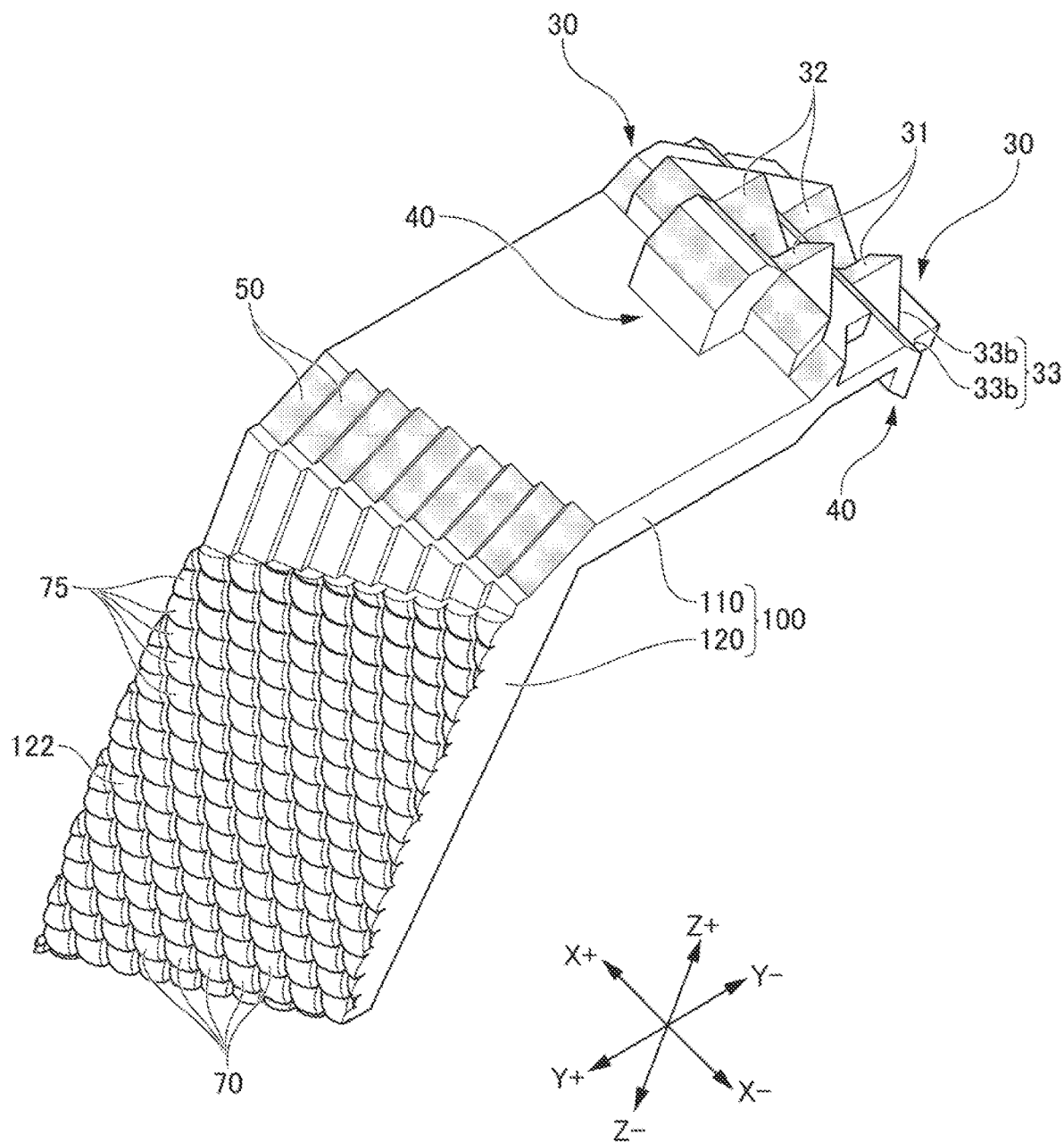
FIG. 3 is a perspective view showing the lens structure.

The light emitting part 120 has a light emitting surface 122 at the end face on the Y+ direction side, as shown in FIG. 3, and has a light emitting back face 121 at the end face on the Y-direction side, as shown in FIG. 4.

As shown in FIG. 4, a reflective row 60 serving as a row on which the plurality of back reflective surfaces 65 are arranged in the Z direction is arranged in the X direction on the light emitting back face 121. The reflective row 60 exists on every introduction reflective surface 50. Hereinafter, a region including all reflective rows 60 is referred to as "reflective region R60". In the present embodiment, the reflective region R60 makes a parallelogram in a plan view seen in the Y direction, and reflective rows 60 are arranged to be shifted from each other in the Z direction. More specifically, it is positioned more to the Z− direction side for reflective rows 60 more to the X+ direction side.

Figure 15:
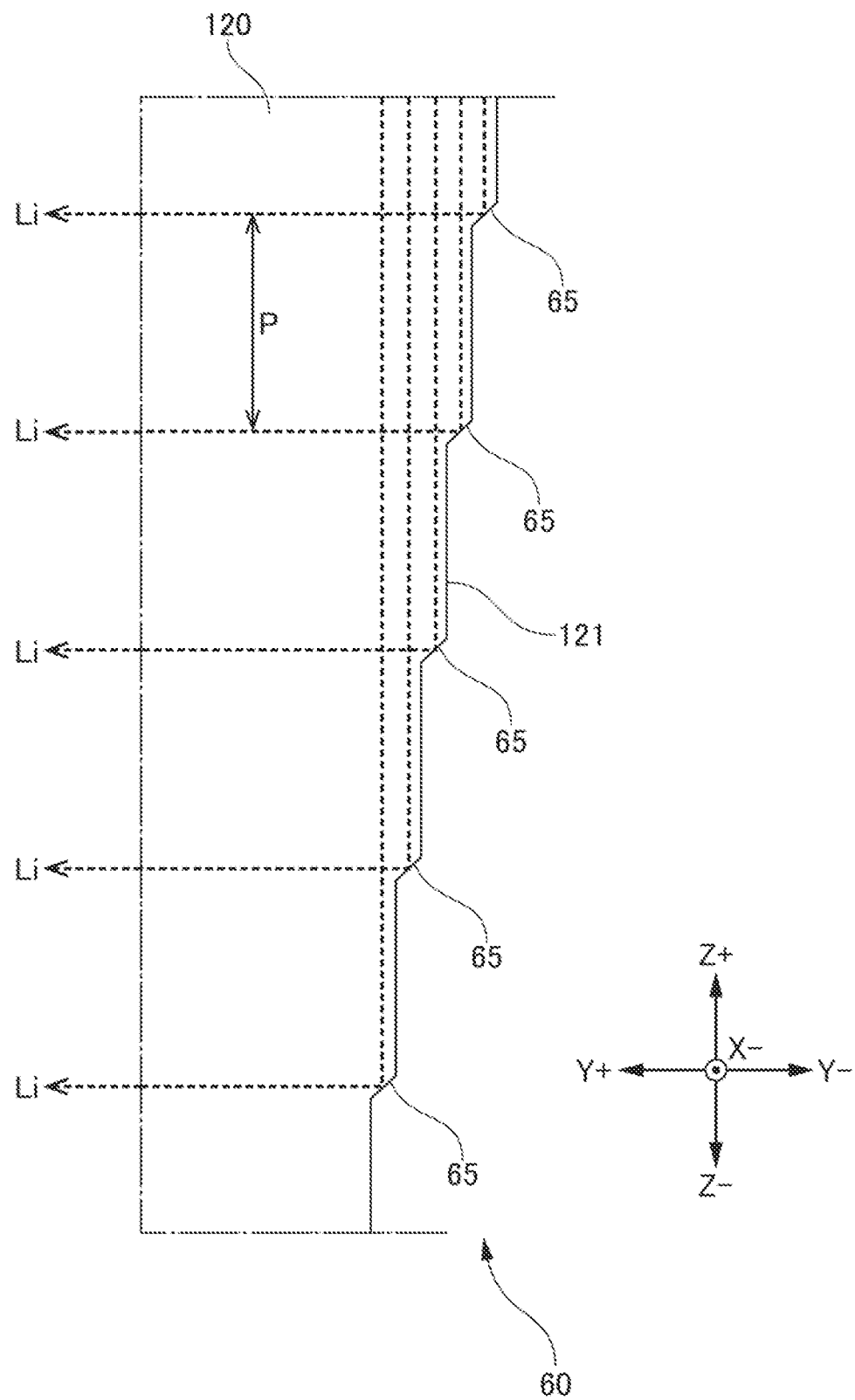
FIG. 15 is a side view showing a light-emitting back surface and periphery thereof.

Among the respective reflective rows 60 as shown in FIG. 14, the back reflective surface 65 are arranged in the Z direction at a predetermined Z-direction pitch P, and each back reflective surface 65 is formed at a predetermined depth D, i.e. predetermined size in the Y direction and Z direction. The back reflective surface 65 is positioned more to the Y+ direction side for a back reflective surface 65 more to the Z− direction side. As shown in FIG. 15, each back reflective surface 65 has a normal direction sloping 45° to the Y+ direction side relative to the Z+ direction, and the light Li from the introduction reflective surface 50 is completely reflected to the Y+ direction. According to the above configuration, the parallel light travelling in the Z− direction through the light emitting part 120 completely reflects to the Y+ direction hitting the back reflective surface 65, in order from that positioned more to the Y− direction side.

Figure 16:
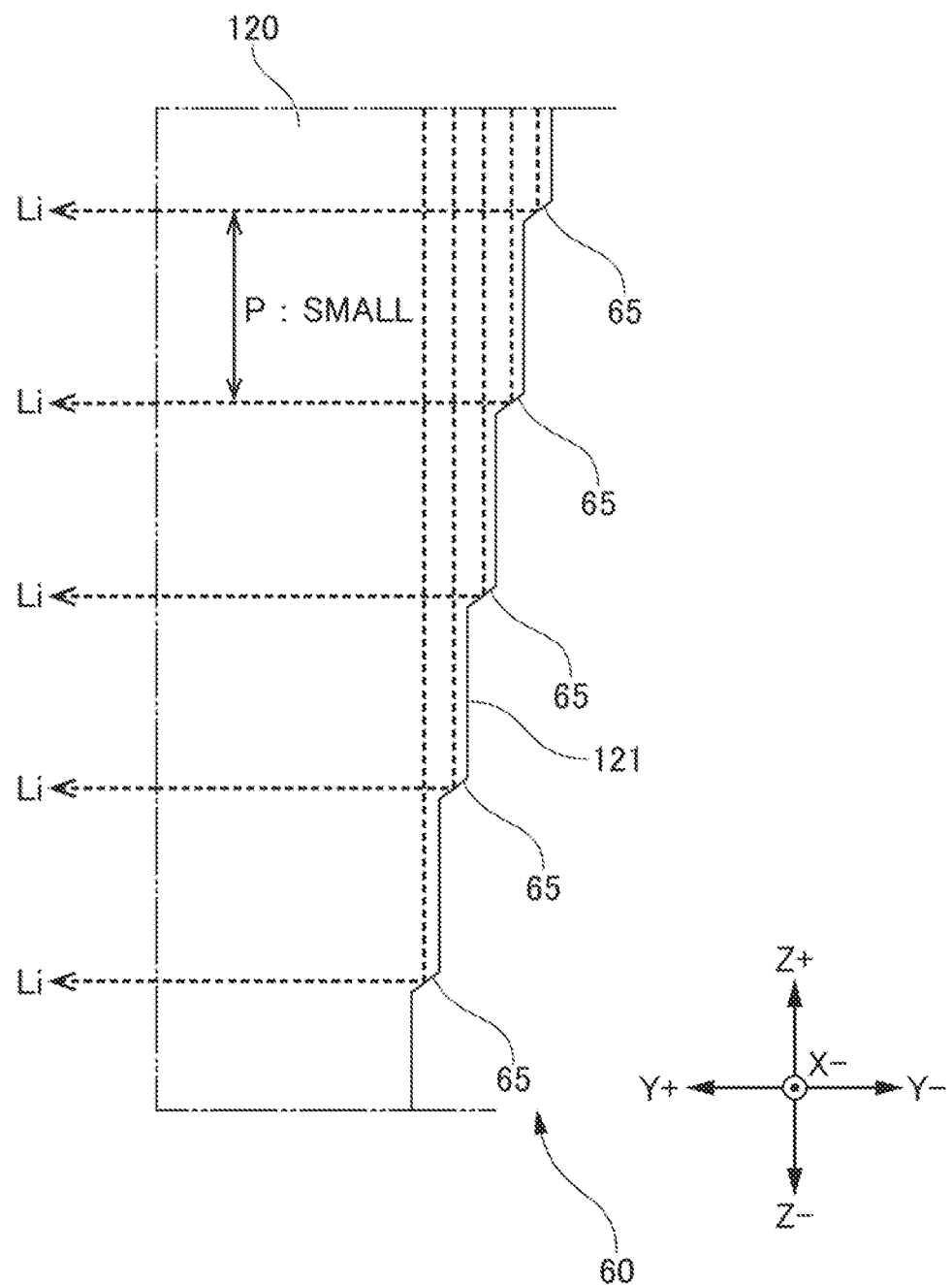
FIG. 16 is a side view showing a modified example of a light-emitting back surface and periphery thereof.

In the design stage of the lens structure 100, it is possible to adjust the size in the Z direction of the reflective region R60 shown in FIG. 4, by adjusting the Z− direction pitch P, or adjusting the depth D. More specifically, for example, in the case of decreasing the Z− direction pitch P as shown in FIG. 16, it is possible to decrease the size of the reflective region R60 shown in FIG. 4 in the Z direction, and in the case of increasing the size of the Z-direction pitch P contrary to this, it is possible to increase the size of the reflective region R60 in the Z direction.

Figure 2:
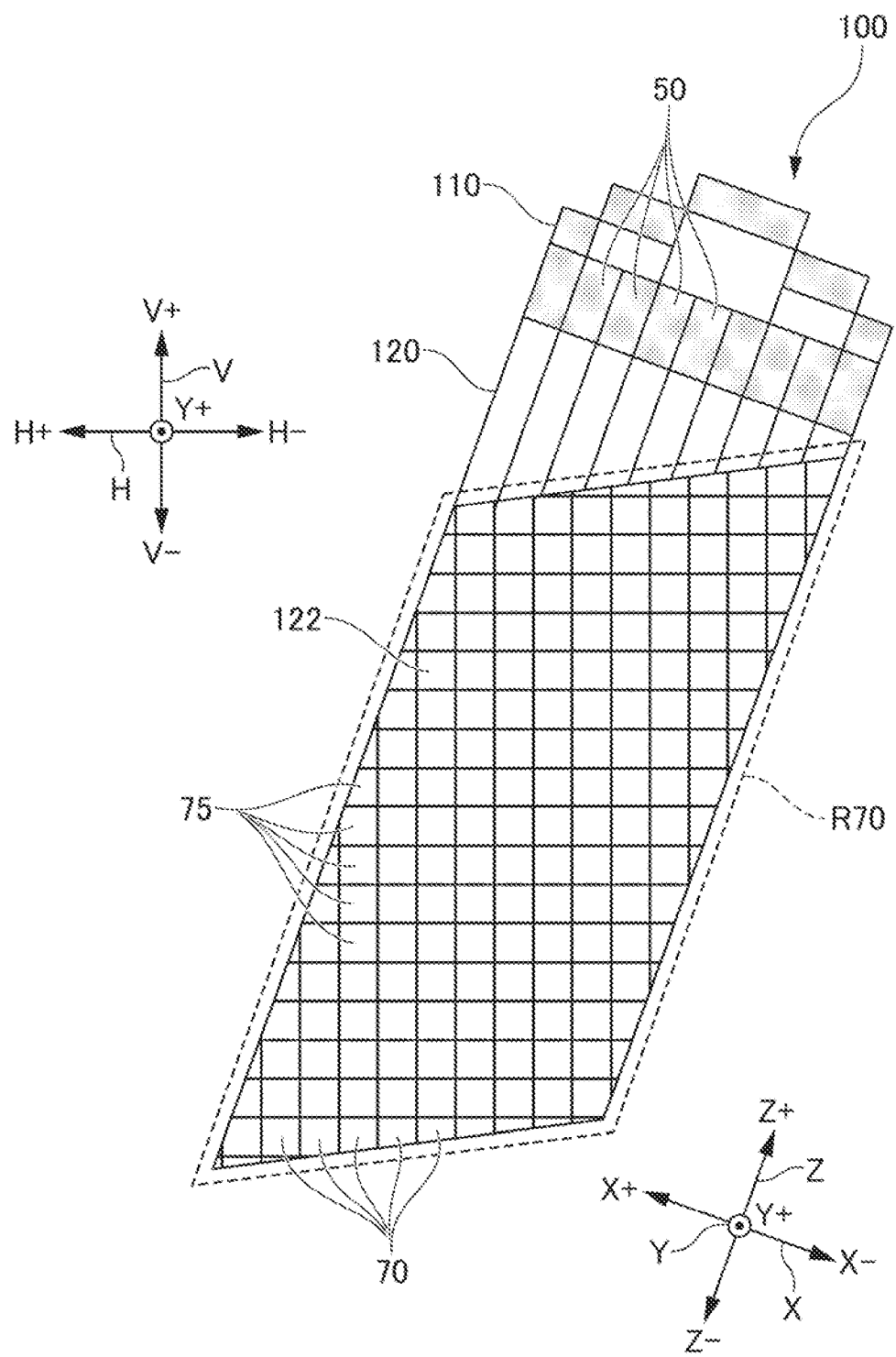
FIG. 2 a view showing the lens structure in a Y direction.
Figure 17:
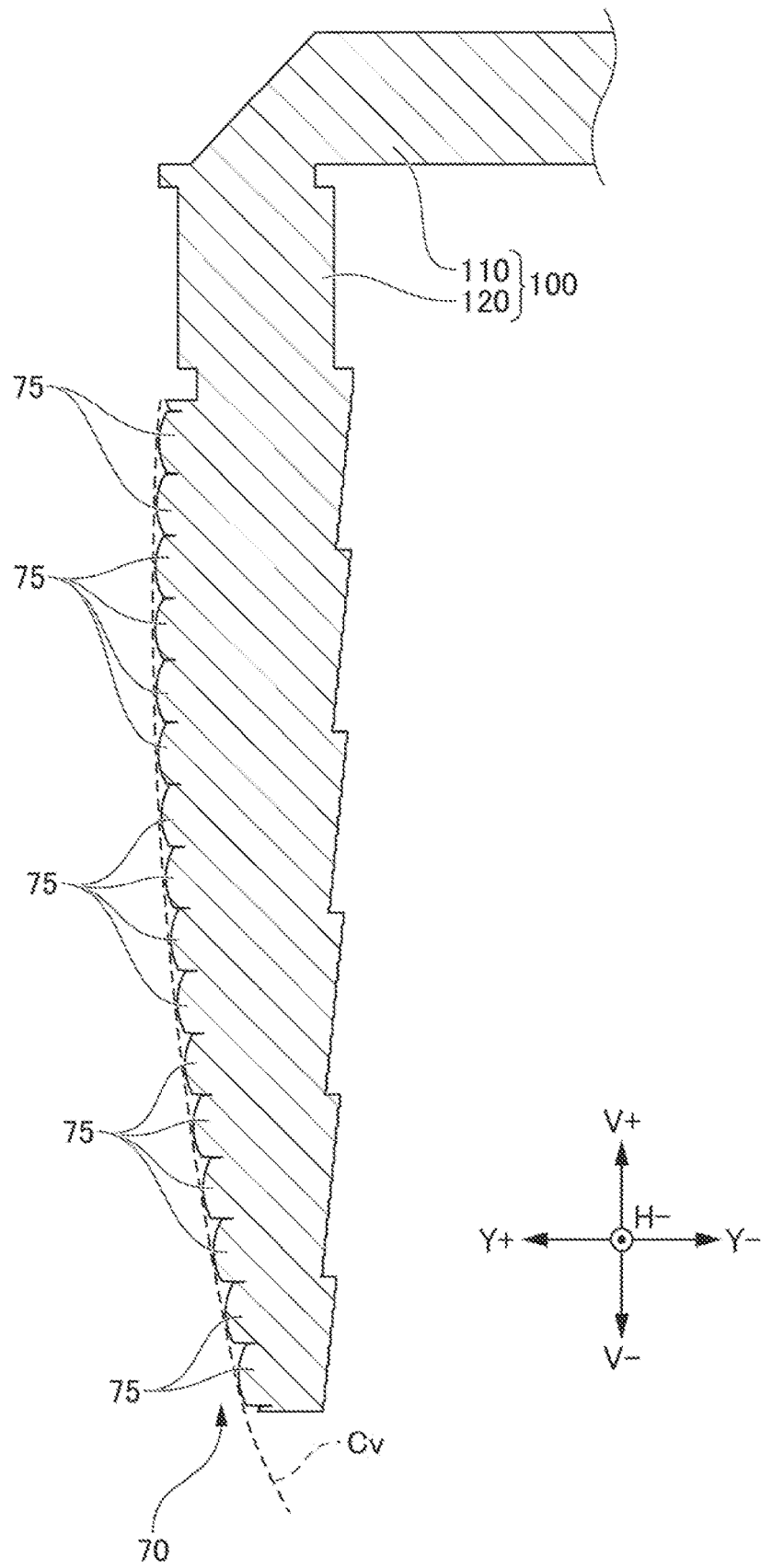
FIG. 17 is a view showing the arrangement of optical cuts in an optical array.

As shown in FIG. 2, an optical row 70 serving as a row on which a plurality of optical cuts 75 are arranged in the vertical direction V are arranged in the H direction on the light emitting surface 122. More specifically, as shown in FIG. 5, the plurality of optical rows 70 aligning in the H direction are arranged to be shifted in the Y direction from each other. Then, as shown in FIG. 17, in each optical row 70, the plurality of optical cuts 75 aligning in the vertical direction V are installed to be shifted in the Y direction from each other. Each optical cut 75 causes the light Li from the back reflective surface 65 to diffuse.

Hereinafter, the configuration and effects of the present embodiment will be summarized.

As shown in FIG. 13B, in addition to the first reflective surface 31 including the first reflective surface sub part 31b projecting from the first reflective surface main part 31a to the X+ direction, the second reflective surface 32 includes the second reflective surface sub part 32b projecting from the second reflective surface main part 32a to the X− direction. For this reason, compared to case of the first reflective surface 31 and second reflective surface 32 being a simple rectangle viewed in the Z direction, as in the case of the comparative example shown in FIG. 12B, the degrees of freedom in design of the cross-sectional shape of the region of light Li guided to both sides of the X direction by the first reflective surface 31 and second reflective surface 32 improves. Accordingly, as shown in FIG. 13A, the degrees of freedom in design for the cross-sectional shape of the region of light Li guided to the Y+ direction subsequently also improves.

Moreover, as shown in FIG. 7, the first reflective surface sub part 31b and second reflective surface sub part 32b align in the Y direction, and as shown in FIG. 8, the first reflective surface sub part 31b and second reflective surface sub part 32b intersect in a plan view seen in the Y direction. For this reason, as shown in FIG. 6, it is possible to efficiently use the region between the first reflective surface main part 31a and second reflective surface main part 32a without waste.

As shown in FIG. 7, the third reflective surface 33 causes light from the first reflective surface 31 to be completely reflected to the Y+ direction. The fifth reflective surface causes the light from the collimator 20 to be completely reflected to the Y+ direction. The fourth reflective surface 34 causes the light from the second reflective surface 32 to be completely reflected to the Y+ direction. For this reason, it is possible to guide the light from the collimator 20 to the Y+ direction from each route among routes r1, r2 passing via the first reflective surface 31 and third reflective surface 33, route r3 passing via the fifth reflective surface 35, and routes r4, r5 passing via the second reflective surface 32 and fourth reflective surface 34.

More specifically, the third reflective surface main part 33a causes the light from the first reflective surface main part 31a to be completely reflected to the Y+ direction, and the third reflective surface sub part 33b causes the light from the first reflective surface sub part 31b to be completely reflected to the Y+ direction. The fourth reflective surface main part 34a causes the light from the second reflective surface main part 32a to be completely reflected to the Y+ direction, and the fourth reflective surface sub part 34b causes the light from the second reflective surface sub part 32b to be completely reflected to the Y+ direction. Based on this, the light Li in the Z+ direction side can be guided in the Y+ direction from each of the five routes r1 to r5.

As shown in FIGS. 7 and 8, the light Li guided to the Y+ direction from each of the first to fifth routes r1 to r5 aligns in the X direction. For this reason, as shown in FIG. 13A, it is possible to elongate in the X direction the cross-sectional shape of the regions R31b, R31a, R35, R32a and R32b of light guided to the Y+ direction. For this reason, the present embodiment can be favorably applied to cases where it is desired to elongate the cross-sectional shape of the region of this light in the X direction.

As shown in FIG. 5, the base 110 has a plurality of, specifically two, reflectors 30. For this reason, compared to a case of only being one reflector 30, it is possible to more greatly secure the route guiding the light Li to the Y+ direction. In addition, as shown in FIG. 4, by this plurality of reflectors 30 being installed to be shifted from each other in the Y direction and Z direction, it is possible to avoid interference between reflectors 30, and interference between routes of the light Li passing via each reflector 30.

As shown in FIG. 14, the back reflective surfaces 65 are arranged in the Z direction at the light emitting back face 121. For this reason, as shown in FIG. 15, it is possible to cause parts of parallel light to the Z− direction to be completely reflected sequentially to the Y+ direction, by the back side reflective surfaces 65 arranged in the Z direction. Moreover, at the design stage of the lens structure 100, it is possible to adjust the size in the Z direction of the reflection region R60 shown in FIG. 4, by adjusting the depth D and Z-direction pitch P of each back side reflective face 65 shown in FIG. 14. It is thereby possible to adjust the size in the Z direction of the light emitting region R70 formed on the light emitting surface 122. For this reason, according to the present embodiment, it is possible to easily adjust the size of the light emitting region R70.

As shown in FIG. 14, within each reflective row 60, it is positioned more to the Y+ direction side for a back reflective surface 65 more to the Z− direction side. For this reason, as shown in FIG. 15, the parallel light from the introduction reflective surfaces 50 to the Z− direction hits the back side reflective faces 65 in order from one more to the Y− direction side to entirely reflect to the Z+ direction. For this reason, the parallel light in the Z− direction from the introduction reflective surfaces 50 can be sequentially totally reflected in the Y+ direction effectively.

As is evident from FIG. 4, a plurality of reflective rows 60 are arranged in the X direction to be shifted in the Z direction from each other, among the reflective region 60 of parallelogram shape in a plan view seen in the Y direction. For this reason, as in the case of the present embodiment, even in the case of the reflective region R60 being a parallelogram shape rather than rectangular, it can be handled easily.

As shown in FIG. 2, the optical row 70 having optical cuts 75 diffusing light Li from the back side reflective face 65 arranged in the vertical direction are arranged in the H direction on the light emitting surface 122. It is thereby possible to form the light emitting region R70 as a region of the optical cuts 75 spreading in the vertical direction V and H direction.

As shown in FIG. 5, the plurality of optical rows 70 aligned in the H direction are arranged to be shifted in the Y direction from each other. It is thereby possible to shift the end on the Y+ direction side of each optical row 70 aligned in the H direction, while facing the optical axis direction of each optical row 70 in the Y+ direction, to the Y direction in order smoothly in a curve Ch shape.

As shown in FIG. 17, in each optical row 70, each of the plurality of optical cuts 75 aligned in the vertical direction V is arranged to be shifted in the Y direction from each other. It is thereby possible to shift the ends on the Y+ direction side of each optical row 70 aligned in the vertical direction V in the Y direction in order smoothly in a curve Cv shape, while facing the optical axis direction of each optical cut 75 in the Y+ direction.

Other Embodiments

The above embodiment can be realized by modifying in the following way, for example. In the first embodiment explains a case of the lens structure 100 of a portion on the most outer side in the vehicle width direction of the headlight 500, as shown in FIG. 1; however, in the case of the lens structure of another portion, the end on the Y+ direction side of the lens structure may be made into a loose step shape compared to the step shape shown in FIG. 5. In addition, the end on the Y+ direction side of the lens structure may be made into a linear shape rather than a curve Ch shape. In addition, the lens structure 100, for example, may be used in a vehicle light body other than a headlight, such as a vehicle side marker or hazard lamp.

EXPLANATION OF REFERENCE NUMERALS 50 introduction reflective surface
60 reflective row
65 back-side reflective surface
70 optical row
75 optical cut
100 lens structure for vehicle light body
110 base
120 light emitting part
121 light emitting back surface
122 light emitting surface
Li light
Ls light source
R60 reflective region
R70 light emitting region

What is claimed is:

1. A lens structure for a vehicle light body which causes light to emit in a Y+ direction as one way of a predetermined Y direction, the lens structure comprising:
    a light emitter extending in a Z direction orthogonal to the Y direction, and having a light emitting surface at an end face on a side of the Y+ direction, and a light emitting back surface at an end face in a Y-direction opposite the Y+ direction; and
    a base which guides light to an end of the light emitter in a Z+ direction as one way of the Z direction,
    wherein the light emitter includes an introduction reflective surface which causes light from the base to completely reflect as parallel light to a Z-direction which is opposite to the Z+ direction, and a back-side reflective surface arranged in the Z direction on the light emitting back surface,
    wherein each of the back-side reflective surfaces has a normal direction sloping relative to the Z direction, and completely reflects the parallel light from the introduction reflective surface to the Y+ direction,
    wherein on the light emitting back surface, a plurality of reflective rows containing a plurality of the back-side reflective surfaces arranged in the Z direction is arranged in an X direction orthogonal to the Z direction and the Y direction,
    wherein on the light emitting surface, a plurality of optical rows in which optical cuts for diffusing light from the back-side reflective surface are arranged in a vertical direction is arranged in an orthogonal direction which is orthogonal to the vertical direction and the Y direction,
    wherein when viewed in the Y direction, a length direction of each of the reflection rows is inclined with respect to a length direction of each of the optical rows, and
    wherein the light emitting surface causes light to emit from the back-side reflective surface.

2. The lens structure for a vehicle light body according to claim 1,
    wherein within each of the reflective rows, a back-side reflective surface more to a side in the Z− direction is positioned more to a side in the Y+ direction.

3. The lens structure for a vehicle light body according to claim 2, wherein, in a plan view seen in the Y direction, the plurality of reflective rows are shifted from each other in the Z direction, and are arranged in the X direction, within a reflective region of a difference shape than rectangular.

4. The lens structure for a vehicle light body according to claim 1,
    wherein the plurality of optical rows are disposed to be shifted from each other in the Y direction.

5. The lens structure for a vehicle light body according to claim 1,
    wherein the plurality of optical cuts are disposed to be shifted from each other in the Y direction within the optical row.

* * * * *